United States Patent [19]

Mostkoff

[11] Patent Number: 5,259,695
[45] Date of Patent: Nov. 9, 1993

[54] ARTIFICIAL REEF MODULE AND METHOD

[76] Inventor: Benjamin J. Mostkoff, 4900 Lakeview Dr., Miami Beach, Fla. 33140

[21] Appl. No.: 948,159

[22] Filed: Sep. 21, 1992

Related U.S. Application Data

[63] Continuation of Ser. No. 800,857, Nov. 26, 1991, abandoned.

[51] Int. Cl.⁵ .............................................. E02B 3/06
[52] U.S. Cl. ........................................ 405/29; 405/21
[58] Field of Search ....................... 405/25, 29, 30, 35, 405/21, 24

[56] References Cited

U.S. PATENT DOCUMENTS

| | | | |
|---|---|---|---|
| 2,344,302 | 3/1944 | Harza | 405/33 X |
| 3,456,446 | 7/1969 | Kusatake | 405/29 |
| 3,548,600 | 12/1970 | Stolk, Jr. et al. | 405/30 |
| 3,928,701 | 12/1975 | Roehner | 405/30 X |
| 4,080,793 | 3/1978 | Pulsifer | 405/30 |
| 4,388,019 | 6/1983 | Kajihara | 405/25 |
| 4,502,816 | 3/1985 | Creter, Jr. et al. | 405/25 X |
| 5,080,526 | 1/1992 | Waters | 405/25 X |

FOREIGN PATENT DOCUMENTS

| | | | |
|---|---|---|---|
| 1130643 | 12/1984 | U.S.S.R. | 405/29 |
| 927306 | 5/1963 | United Kingdom | 405/29 |

*Primary Examiner*—Randolph A. Reese
*Assistant Examiner*—J. Russell McBee
*Attorney, Agent, or Firm*—Jack E. Dominik

[57] ABSTRACT

An essentially equilateral tetrahedron having essentially four equilateral sides, each of which, in turn, an equilateral triangle is disclosed. The reef module may be any size, but for practical purposes in excess of one foot on an edge, and not necessarily exceeding six feet on an edge by a significant amount. The medium primarily employed to hold the implanted tire chips in place is cement, or its equivalent. Desirably a hydraulic cement is employed because of its high strength capability as well as durability. A related aspect of the present invention looks to the provision of lifting means on each such equilateral-tetrahedron to permit the same, with relatively crude equipment, to be moved about in a factory sight, on to trucks, on to barges, and off barge to its ultimate resting place at the bottom of the sea. In connection with the method of forming the modules, an open-ended three sided mold is formed in the shape of a tetrahedron with the open end up. It is filled with approximately half the weight of tire chips that the mold is capable of holding with the resulting void being concrete. The proportions are not necessarily critical to the invention but exemplary of the mix and the result which can be obtained, namely, with an exemplary tetrahedron three feet on each edge, approximately five and three eights tires in the form of tire chips can be encased and permanently dispatched to the bottom of the sea, ocean, bay, lake or any other body of water.

12 Claims, 2 Drawing Sheets

ARTIFICIAL REEF MODULE AND METHOD

CROSS-REFERENCED TO RELATED APPLICATION

The present application is a continuation of application of Ser. No. 800,857 filed Nov. 26, 1991 and entitled "Artificial Reef Module and Method" by the same inventor herein, and now abandoned.

FIELD OF THE INVENTION

The present invention relates to developing an artificial reef module utilizing chipped or shredded automobile or truck tires as an aggregate component in a concrete mixture, which mixture is poured into a tetrahedron shape mold, cured, unmolded and subsequently deployed or dumped in large quantities onto a permitted artificial reef site thereby forming a complex artificial reef system with high spatial complexity which provides a correspondingly high biological diversity for the breeding and growth of marine life. Due to the random and interlocking nature of the tetrahedron units, the modules have the ability to serve as breakwater or erosion structures.

SUMMARY OF THE PRIOR ART

Tires pose a significant solid waste disposal problem on a global level, with an estimated 280 million, or one tire per person, being discarded each and every year in the United States alone. Secondary markets exist for the use of discarded tires and include: the re-treading or re-capping industry, utilization of portions of the tire for alternative purposes such as guard rail components, solid rubber tires (as by forklifts), secondary fuel in electric power cogeneration plants, and pulverization for use as component in paving surfaces such as roads and athletic tracks, to name a few. However, these secondary uses only utilize 10% or less of the tire waste stream.

As a result of the serious growing concern of the real (mosquito, vermin breeding areas) and potential (fire and resulting air and water contamination) negative environmental effects of storing or stock-piling tires in large quantities in open air areas, many states in the United States have established guidelines and laws for the storage and disposal of tires. These requirements include that whole tires be stored in covered shelters and that tires stored outdoors must first be reduced to chips which can then be disposed of a conventional trash in a landfill environment or utilized in one of the above referenced secondary markets.

The disposal of tire chips in a landfill also poses concern for certain states with limited landfill capacity. In fact certain states are under order by the U.S. Environmental Protection Agency to reduce significantly the use of existing landfills. Permits for the establishment of new landfills are also under much stricter guidelines and more difficult to obtain. Therefore the reduction of the waste stream to landfill locations is highly desirable.

Various size concrete blocks for use in artificial reefs or shore protection are exemplified in U.S. Pat. No. 3,456,446 issued Jul. 22, 1966 to Sugiaki Kusatake and Harza U.S. Pat. No. 2,344,302 issued Mar. 14, 1944. Various compositions for disposing of spent automobile tires, in whole or chipped form, which are a worldwide disposal problem, are exemplified in Rubenstein U.S. Pat. No. 3,317,189 issued May 2, 1967 and U.S. Pat. No. 4,080,793 of Mar. 28, 1978 to Paul Sifer.

The concept of disposing of spent automobile tires and even chipping them is well known. The concept of clustering disposed of automobile tires by ballasting and strapping them to each other and sinking as a reef is known. However, the well documented problem with this technique is that the strapping eventually succumb to wave and or current energy and fails, breaking apart and subsequently washing up onto an adjacent shoreline or destroying surrounding natural habitat, thereby creating a greater problem than their use as artificial reef material attempted to solve. In fact, the utilization of tire bundles as artificial reef material is no longer authorized by the U.S. Army Corps of Engineers general permit for artificial reef construction.

Moreover, the, concrete forms of artificial reef material have been disclosed in the prior art contained in a "Review of United States Patents Relating to Artificial Reef Technology" by Jeffrey G. Sheldon of Pasadena, Calif., the same being presented to the Third International Artificial Reef Conference Nov. 3–5, 1983 at Newport Beach, Calif. and published in The Bulletin of Marine Science, Volume 37 of July 1985. This sets forth in great detail efforts that have been made to develop modular units for use in artificial reef construction.

What is highly desirable, however, is a modular artificial reef unit which will permanently dispose of spent automobile tires in a format which insures permanent placement at site where deployed and which has a physical configuration which allows for both the construction of low bottom profile habitat suitable for shallow water (less than 100 feet) or inshore artificial reefs, or alternatively for the construction of high bottom profile habitat suitable for deep water (100 feet plus) reefs. Continuous concentrated placement of the tetrahedron units in deep water would allow for the formation of artificial "sea mounds" of the size which would attract a wide variety of pelagic, benthic and invertebrate marine life due to the change in the flow of the natural current over, around and through the material and by the elevation of the top of the "mound" to shallower depths which would afford increased sunlight penetration to the reef materials.

SUMMARY OF THE INVENTION

The present invention is directed to forming a modular artificial reef unit cast in concrete with tire "chips" utilized as a component in the aggregate mix and shaped in an essentially equilateral tetrahedron having four equilateral sides, each of which by definition, is an equilateral triangle. The reef module may be any size, but for practical purposes in excess of one foot on an edge, and not necessarily exceeding six feet on an edge by a significant amount. The medium primarily employed to hold the implanted tire chips in place is cement, or its equivalent. Desirably a hydraulic cement is employed because of its high strength capability as well as durability. The same units may also be utilized as structures to reduce beach erosion or in the construction of revetment and or jetty structures. Upon deployment, the tetrahedron shaped units descend vertically in the water column, and orient themselves in a point downward aspect. Unless lowered to the bottom, conventionally shaped concrete artificial reef materials which are off-loaded in simultaneous quantities, have a tendency to "sail" off in different directions in settling to the bottom. This produces a scattered reef of lesser complexity. In contrast, the tetrahedron shaped unit seeks a "path of least resistance" travel and orients itself point downward in a nearly vertical descent to the bottom, which allows for a dense and complex clustering of the units at the deployment site. A related aspect of the present invention looks to the provision of lifting means on each such equilateral tetrahedron to permit the same, with relatively crude equipment, to be moved about in a factory site, onto trucks, onto barges, and off the barge to its ultimate resting place at the bottom of the sea. In connection with the method of forming the modules, an open-ended three-sided mold is formed in the shape of a tetrahedron pyramid with the open end up. The form is filled with a concrete and tire "chips" aggregate mixture, which mixture is calculated as half the weight of tire chips that the mold is capable of holding with the resulting volume void being concrete. The proportions are not necessarily critical to the invention but exemplary of the mix and the result which can be obtained, namely, with an exemplary tetrahedron three feet on each edge, approximately 5.4 tires, (assumption: 1 tire=20 lbs. or 100 tires=2000 lbs.) which have been reduced to tire "chips" can be encased and permanently dispatched to the bottom of the sea, ocean, bay, lake or any other body of water. Furthermore, one must consider that tire chips or equivalent inert waste materials do not inherently, attack marine life. This may be attributable to the exudation of toxic materials, or the fact that they are inert, or many other factors. Conversely, concrete is known to attract marine life, and to have the capability of encapsulating power chips and other waste material. Therefore, a major objective is achieved by the present invention in developing a reef module which will inherently attack marine life when clustered with other like modules, while at the same time encapsulating tire chips or other waste material for which there is no other practical form of disposal. In this context it will be remembered that the earth's available supply of concrete is very substantial, and that man's ability to pollute the environment with automobile tires is similarly incalculable.

Yet another object of the present invention can be achieved by developing under water clusters of modules which will cause an upswelling of the bottom current to deposit further marine life, and create zones of quiet between like such structures where marine life will find refuge from swift currents, and find easily accessible food at the same time.

BRIEF DESCRIPTION OF THE DRAWINGS

Further objects and advantages of the present invention will become apparent as the following description of an illustrative embodiment proceeds, taken in conjunction with the accompanying drawings, in which.

DESCRIPTION OF PREFERRED EMBODIMENT

Figure 2:
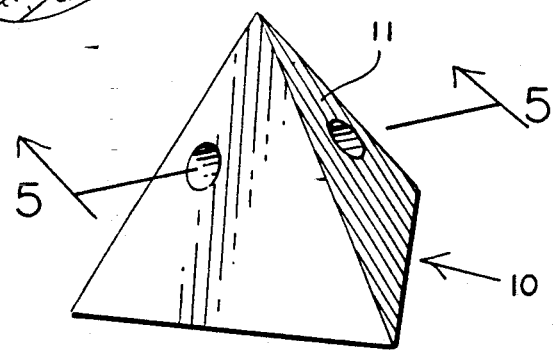
FIG. 2 is an isometric view of an exemplary such tetrahedron showing, in partially phantom lines, lifting eyes which can be employed to raise same.
Figure 6:
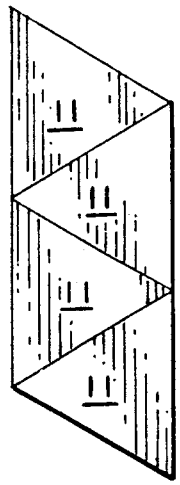
FIG. 6 is a fold out of the faces of FIG. 2.

The preferred embodiment of the subject invention tetrahedron 10 is shown in FIG. 2. There it will be seen that equilateral triangular faces 11 make up the four faces of the entire tetrahedron. This is shown in fold-out form in FIG. 6 where, when all the edges are folded, an enclosed tetrahedron of the shape exemplary of the present invention is formed.

Figure 5:
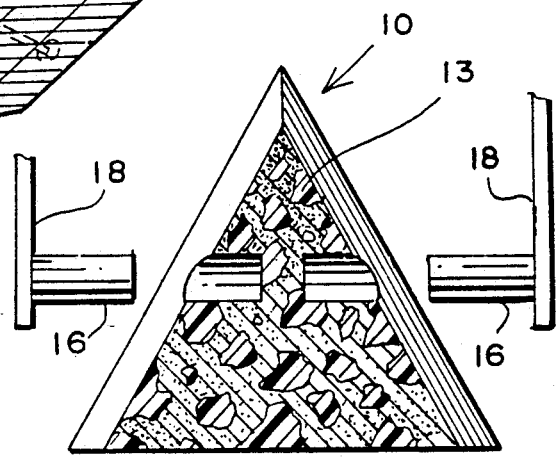
FIG. 5 is an exemplary cross-section taken through the exemplary tetrahedron of section 5—5 of FIG. 2.

Particularly as shown in FIG. 5, tire chips 13 are used as the aggregate for the mix which is poured into the mold 12. These tire chips 13 are commonly shredded to a maximum size of four inches by four inches, with some being of smaller dimension. Such tire chips 13 also have the unique characteristic of containing shredded portions of any steel belting, and other shredded surfaces which protrude from the edges of the chips and provide excellent adhesion with the concrete or other binder used to contain the same.

Figure 1:
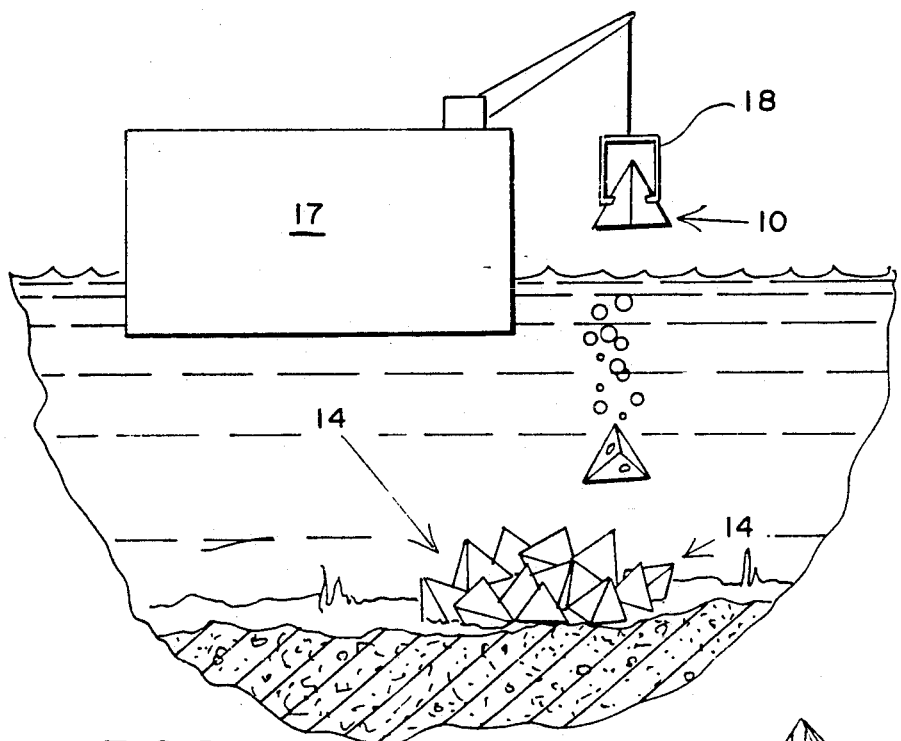
FIG. 1 is a diagrammatic view of a flat deck barge and a hopper barge on the surface of the sea deploying modular tetrahedrons to form a reef on the bottom.
Figure 3:
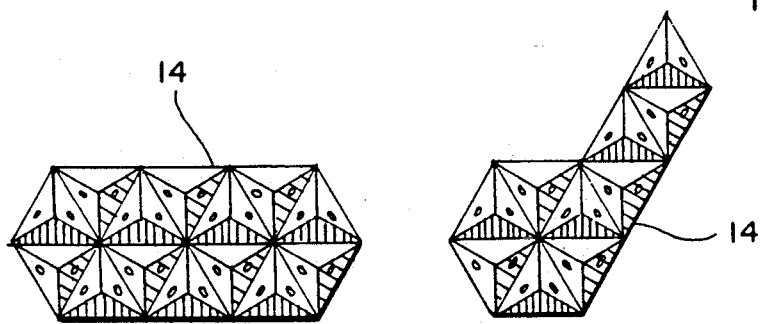
FIG. 3 is a plan view of the bottom of a barge showing how a single layer of the tetrahedron reef units are positioned for transport to the reef sight.
Figure 4:
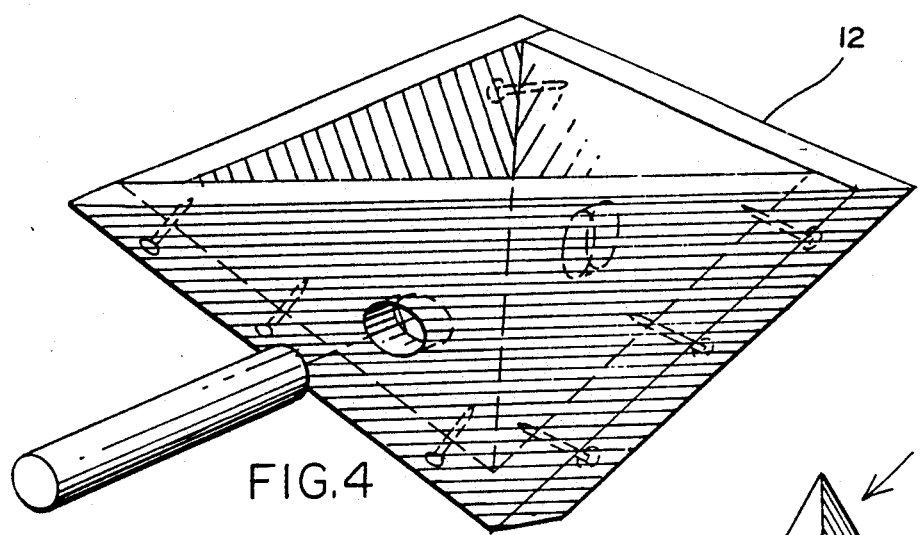
FIG. 4 discloses a very simple form of mold to use for forming the tetrahedrons.

As noted in FIG. 5, and also FIG. 2, provision is made by means of precast cylindrical openings 15 to receive cylindrical prongs of an ice pick-like grip which will permit the same to be on-loaded and off-loaded of a barge 17, such as shown in FIG. 1 by means of the trapeze 18. A simple spreading of the members of the trapeze will remove the cylindrical prongs 16 and the tetrahedron 10 will drop in the fashion as shown with a vertex ultimately extending downwardly until the module 10 arrives at the reef site 14, again as illustrated in FIG. 1. Also shown in FIG. 3 are the orientations of the modules, 10 as they may appear in the bottom of a hopper barge 17 or other storage or off-loading facility.

In a typical mixture, the following proportions were employed of concrete mix, (prepared water and cement mixture), and tire chips.

EXAMPLE 1

| UNIT HEIGHT | WEIGHT OF: | | |
|---|---|---|---|
| | CONCRETE | TIRE CHIPS | TOTAL |
| 1 ft. | 16 lb. | 4 lb. | 20 lb. |
| 2 ft. | 128 lb. | 32 lb. | 160 lb. |
| 3 ft. | 432 lb. | 108 lb. | 540 lb. |
| 4 ft. | 1024 lb. | 256 lb. | 1280 lb. |
| 5 ft. | 2000 lb. | 500 lb. | 2500 lb. |
| 6 ft. | 3456 lb. | 864 lb. | 4320 lb. |

Above calculations are based upon construction of 1 ft. high test units and Volume of tetrahedron expressed as $(.11785)L^3$, where L = unit height cubed.

Variations can be made by increasing the percentage of concrete or decreasing it. The current ratio of concrete to tire chips produces a modular unit wherein each tire, (represented as 20 pounds of tire chips), is ballasted by eighty (80) pounds of concrete. This ballast ratio equals or exceeds the ratios currently being utilized by the states of Virginia and New Jersey in their construction of tire artificial reefs. Increasing the volume of concrete will produce tetrahedron units with a greater ballast ratio, which are desirable for breakwater or surf zone artificial reef construction. The greatest cost in the construction of the units is the concrete, as it is anticipated that the discarded tire chips will be readily available at no cost from municipalities seeking alternatives to the current disposal options of landfill use, burning, or other forms of disposition.

Figure 7:
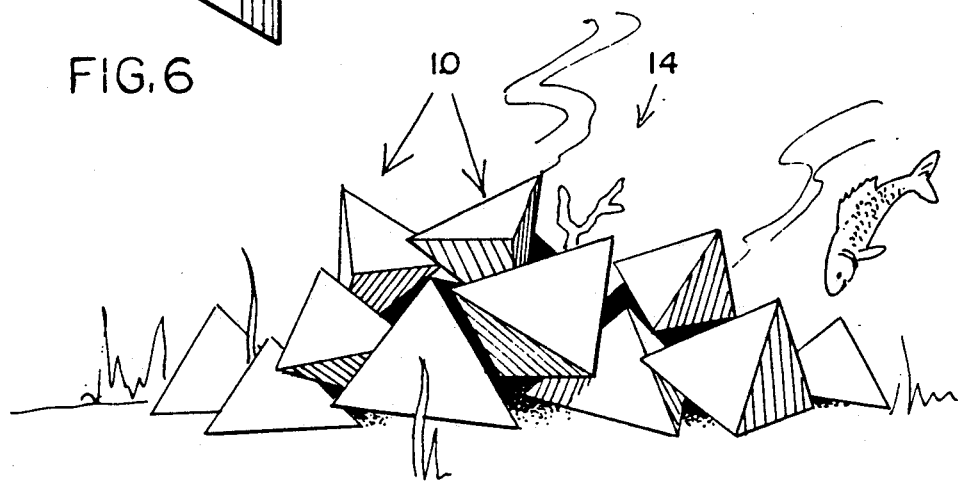
FIG. 7 is a typical reef cross-section.

As the reefs 14 are developed, particularly as illustrated in FIGS. 1 and 7, the preferential approach is to instantaneously deploy or dump at least 100 tons, or 46 modules of 6 ft. height, or 80 modules of 5 ft. height, etc., from a given position of the barge; which barge, is preferably a hopper or bottom opening barge. When a sea mound is to be developed, the placement operation may take place for years, and cover areas as large as the entire permitted artificial reef site or over concentrated areas as small as 100 square feet within the boundaries of the reef site. Where a reef is being built, however, a "on the bottom" stacking height of at least three modules is highly desirable to form a complex artificial reef system with high spatial complexity which provides a correspondingly high biological diversity for the breeding and growth of marine life. As a result, any reef with less than three modules in depth will lose the synergistic value of combining several of the tetrahedrons. Conversely, the modules can be dumped to virtually any depth accommodated by the sea and not a hazard to navigation. In this fashion, a municipality with thousands and thousands of tires requiring disposition every year can be accommodated without resort to unsightly land fill, burning, or other disposal techniques.

Method

The method of forming an artificial reef combines the steps of chipping spent automobile, truck, bicycle, or even airplane tires or like disposable products which are not biodegradable into chunks which can be embedded in an essentially concrete or equivalent material in an equilateral tetrahedron. Configurations other than an equilateral tetrahedron have been considered but to the extent they are more likely to nest even when dropped in a random fashion than the equilateral tetrahedron they defeat the purpose of insuring that there will be spaces between each and every one of the modules, rather than if a plurality of square cubes were dropped, and they can stack face on face on top of each other. Thereafter, the method further contemplates forming such tetrahedrons and dropping them in a random fashion on the bottom of the sea to a desired stacking height of at least three such units. In addition, the method contemplates forming the tetrahedron out of a mix of concrete and tire chips in which the weight of the tire chips is approximately half of the weight of tire chips required to fill the tetrahedron when no other ingredients are placed in it.

Although particular embodiments of the invention have been shown and described in full here, there is no such limitation of embodiments. On the contrary, the intention is to cover all modifications, alternatives, embodiments, usages and equivalents as fall within the spirit and scope of the present invention, specification and appended claims.

What is claimed is:

1. An artificial reef module for positioning on the bottom of a body of water comprising, in combination,
   a solid body comprising a mixture of concrete-like material and disposable, spent, relatively non-biodegradable pieces of material by embedding said material into a concrete encased solid module,
   said solid module having a plurality of substantially solid planar faces,
whereby an artificial reef module is prepared which will have sufficient weight to stay on the bottom of said body of water while forming an artificial reef.

2. The artificial reef module of claim 1, in which said module is equilateral.

3. The artificial reef module of claim 2, in which said equilateral module is a tetrahedron.

4. In the artificial reef module of claim 1, in above, two or more essentially dead end cylindrical receiving holes molded into the module at a distance above the center of gravity,
whereby a pair of lifting eyes having a shaft can be positioned in the receiving holes and utilized to raise the unit and drop the unit without extensive custom grappling rigs.

5. In the module of claim 4 above,
   said material comprising tire chips from rubber-like tires.

6. The method of making an artificial reef comprising the steps of:
   commuting a plurality of disposable essentially non-biodegradable elements into chips of a dimension essentially less than four inches by four inches,
   forming a solid module containing the chips along with a concrete-like binder into a module having edge dimensions of not less than one foot and not more than six feet and having a plurality of substantially solid planar faces,
   moving the aforesaid module into a position in a body of water where the module can be released and dropped along with other modules to form an artificial reef.

7. In the method of claim 6 above,
   forming said modules into equilateral tetrahedrons of a plurality of different dimensions,
whereby further random spacing and non-nesting relationship is created between adjacent ones of said tetrahedrons when on the bottom of said body of water.

8. In the method of claim 7 above,
   said biodegradable comminuted elements comprising essentially tire chips from rubber-like tires.

9. In the method of claim 6 above,
   said non-biodegradable comminuted elements comprising essentially tire chips from rubber-like tires.

10. An artificial reef module for positioning on the bottom of a body of water comprising, in combination,
    a solid body comprising a mixture of concrete-like material and disposable, spent, relatively non-biodegradable pieces of resilient material by embedding said material into a concrete encased module,
    said module having a plurality of substantially imperforate planar faces, whereby an artificial reef module is prepared which will have sufficient weight to stay on the bottom of said body of water while forming an artificial reef.

11. An artificial reef module for positioning on the bottom of a body of water comprising, in combination,
    a body comprising a mixture of concrete-like material and disposable, spent, relatively non-biodegradable pieces of resilient material by embedding said material into a concrete encased module,
    said module having a plurality of substantially solid planar faces,
    said planar faces being arranged to form a body having a non-nesting relationship with a like body, whereby an artificial reef module is prepared which will have sufficient weight to stay on the bottom of said body of water while forming an artificial reef.

12. An artificial reef module for positioning on the bottom of a body of water comprising, in combination,
    a solid body comprising a mixture of concrete-like material and disposable, spent, relatively non-biodegradable pieces of resilient material by embedding said material into a concrete encased module, said module having a plurality of substantially solid imperforate planar faces, each face intersecting with the adjacent face at an angle which is not perpendicular, whereby an artificial reef module is prepared which will have sufficient weight to stay on the bottom of said body of water while forming an artificial reef.

* * * * *